United States Patent [19]

Fujita

[11] Patent Number: 4,911,629
[45] Date of Patent: Mar. 27, 1990

[54] CONTROL APPARATUS OF INJECTION MOLDING MACHINES

[75] Inventor: Shigeru Fujita, Numazu, Japan

[73] Assignee: Toshiba Kikai Kabushiki Kaisha, Tokyo, Japan

[21] Appl. No.: 231,481

[22] Filed: Aug. 12, 1988

[30] Foreign Application Priority Data

Aug. 13, 1987 [JP] Japan ................................ 62-202454
Aug. 13, 1987 [JP] Japan ................................ 62-202455
Aug. 13, 1987 [JP] Japan ................................ 62-202456

[51] Int. Cl.$^4$ ............................................. B29C 45/76
[52] U.S. Cl. ................................... 425/135; 264/40.1; 264/40.3; 264/40.6; 264/40.7; 425/143; 425/144; 425/149; 425/150; 425/170; 425/171
[58] Field of Search ............... 425/143, 144, 149, 150, 425/170, 171, 135; 264/40.1, 40.3, 40.6, 40.7

[56] References Cited

U.S. PATENT DOCUMENTS 4,515,545  5/1985  Hinrichs et al. .................... 425/149
4,726,751  2/1988  Shibata et al. ..................... 425/144

Primary Examiner—Jay H. Woo
Assistant Examiner—Timothy W. Heitbrink
Attorney, Agent, or Firm—Cushman, Darby & Cushman

[57] ABSTRACT

Control apparatus for an injection molding machine having a sensor provided for the injection molding machine for producing a signal representing the quality of the molded product or a molding condition of the injection molding machine, a set value memory device in which a permissible range of the signal is set, a judging member for judging as to whether the signal lies in the permissible range, a production lot data memory device containing control data for the injection molding machine with respect to a lot now being produced, and a destination table showing a destination of the data corresponding to a result of judgment of the judging member, a controller for controlling the injection molding machine in accordance with the control data stored in the production lot memory device, and another memory device for storing a plurality of sets of the production lot data regarding various lots or production conditions, and a storing device for determining a destination of the production lot data based on the result of judgment of the judging member by referring to the destination table. The storing device transfers to the production lot data memory device the production lot data whose destination has been determined.

6 Claims, 5 Drawing Sheets

FIG. 3B

| | 04 | | 05 | | 06 | | ... |
|---|---|---|---|---|---|---|---|
| | 04 | | 05 | | 06 | | |
| 74 | 04 | 74 | 05 | 74 | 06 | | |
| 75 | 03 | 75 | 04 | 75 | 05 | | |
| 76 | 05 | 76 | 06 | 76 | 07 | | |
| ... | | ... | | ... | | | |

FIG. 3A

| LOT DATA NUMBER | DESTINATION TABLE | | CONTROL INFORMATION |
|---|---|---|---|
| | JUDGED OUTPUT CODE | DESTINATION PRODUCT LOT DATA NUMBER | |

CONTROL APPARATUS OF INJECTION MOLDING MACHINES

BACKGROUND OF THE INVENTION

This invention relates to control apparatus of an injection molding machine utilized to mold plastic products.

As is well known, in order to obtain plastic molded products having a uniform quality, it is necessary to change from time to time the operating conditions of the injection molding machine in accordance with various conditions. In a case of 24 hours running, for example, since the ambient temperature greatly varies during night-time and day-time it is necessary to finely adjust the injection speed, injection pressure, etc. in response to such variation of external conditions for preventing production of rejects. Heretofore such fine adjustment has been mad by the experience and feeling of the operator so that it has been impossible to prevent production of rejects.

Various types of the control apparatus have been proposed for preventing non-uniform quality of the plastic products molded by an injection molding machine. In one type, the extent of closure of a metal mold is detected for finely adjusting an injection stroke, while in the other type the resin pressure in the metal mold is detected for effecting a fine adjustment of the injection pressure. In each system, a quality variation caused by the variation in an external disturbing factor is controlled by a predetermined system. For example, an item to be adjusted and a method of calculating a quantity to be adjusted are predetermined. For this reason when the variation of the external disturbance factor is a predetermined one, the fine adjustment is possible with a prior art control method but when the external disturbance factor becomes different the prior art control methods are not effective.

Furthermore, the quality of the molded product is greatly influenced not only by such molding conditions as the injection quantity, the injection speed and the filling stroke but also by the configuration (flat sheet, container, thick wall product, thin wall product, and products having small surface irregularities) and the type of the raw material. Even when the variation in the quality (shrinkage, void, silver streak, etc.) is the same, when the causes resulting in the variation are different, different adjusting means must be used for eliminating the causes. For this reason, a single adjusting means is not always effective for molded products having different configurations and for raw materials having different characteristics.

Furthermore, different control systems have been used for molding products wherein the molding conditions are switched, for example, when the metal mold temperature rises. With this molding system since the new value and the switching time to the new value are predetermined and the molding condition is renewed during a molding cycle, the control system cannot cope with variations in external disturbances and the characteristics of the raw materials so that it has been impossible to mold plasic products having stable quality.

SUMMARY OF THE INVENTION

It is an object of this invention to provide novel control apparatus capable of molding plastic products having a stable quality irrespective of variations in the external disturbance and in the characteristics of raw materials.

According to this invention, these and further objects can be accomplished by providing a control apparatus for an injection molding machine characterized by comprising a sensor provided for the injection molding machine for producing a signal representing the quality of a molded product or a molding condition, a permissible range setter in which a permissible range of the signal is set, judging means for judging as to whether the signal lies in the permissible range, production lot data memory means containing a control information for the injection molding machine, with respect to a lot now being produced and a destination table showing a destination of the data corresponding to a result of judgment of the judging means, control means for controlling the injection molding machine in accordance with the control information stored in the production lot data memory means, another memory means for storing a plurality of sets of the production lot data regarding various lots, and storing means for determining a destination of the production lot data based on the result of judgment of the judging means by referring to the destination table stored in the production lot data memory means, the storing means transferring to the production lot data memory means the production lot data whose destination has been determined.

BRIEF DESCRIPTION OF THE DRAWINGS

In the accompanying drawings:

FIG. 3A is a diagram showing the arrangement of production lot data;

FIG. 3B is a table showing the product data stored in memory means;

DESCRIPTION OF THE PREFERRED EMBODIMENTS

Figure 1:
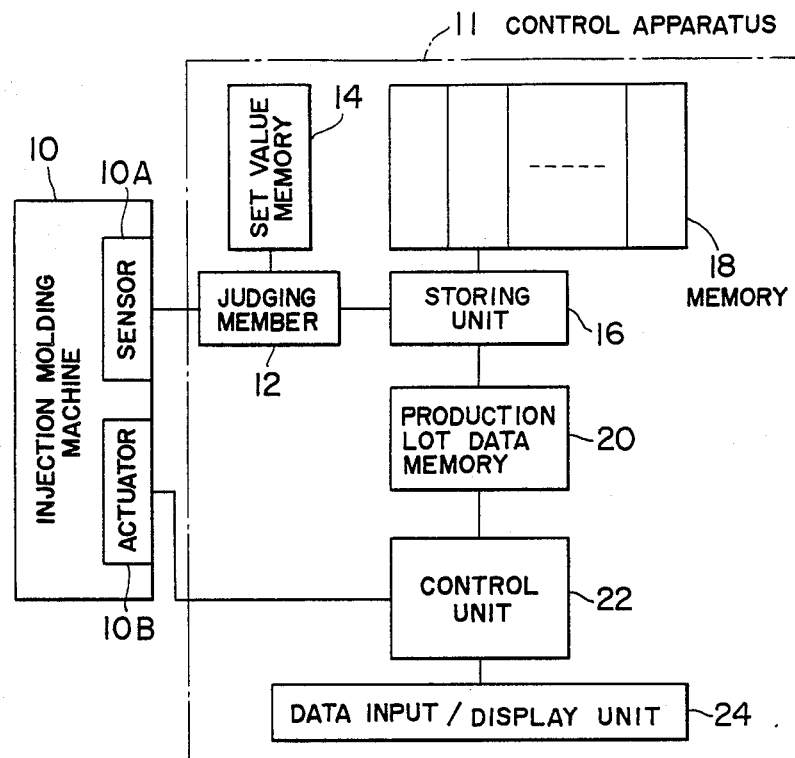
FIG. 1 is a block diagram showing the control apparatus of this invention for use in an injection molding machine.

A preferred embodiment of the control apparatus 11 embodying the invention will now be described with reference to the accompanying drawings. In FIG. 1, an injection molding machine 10 controlled by the control apparatus is used to mold thermoplastic resins and thermosetting resins. These resins are heat melted in an injection cylinder and fluidized resins are injected into a closed metal mold by an injection screw, not shown, so as to mold plastic products. As is well known in the art, the injection molding machine 10 is provided with a sensor 10A for sensing or detecting various conditions of the molding machine 10 and actuators 10B (only one is shown) for actuating various parts of the molding machine 10. Sensors include a position sensor for detecting the degree of mold opening, a pressure sensor for detecting the pressure in a mold cavity, a timer for measuring a filling time, a position detector for detecting the amount of cushion, that is a volume in the front portion of the injection cylinder in which molten resin is accumulated before injection, a temperature sensor for detecting resin temperature, a temperature sensor for detecting the metal mold temperature, a sensor for detecting injection (filling) speed, a pressure sensor for detecting injection or holding pressure, and a sensor for detecting an actual screw torque.

Actuators 10B include pressure apply means for applying pressure to the metal mold, a hydraulic motor for rotating the screw, pressure apply means for applying an injection pressure or a screw back pressure and means for heating the resin.

A judging member 12 for judging the quality of the molded products is connected to the sensor 10A. Set value memory means 14 for judging the quality of the molded products is connected to the judging member 12 which compares a signal detected by sensor 10A and a permissible range of the detected signal stored in the memory means 14 for judging the quality of the molded products, as will be described later.

Figure 2:
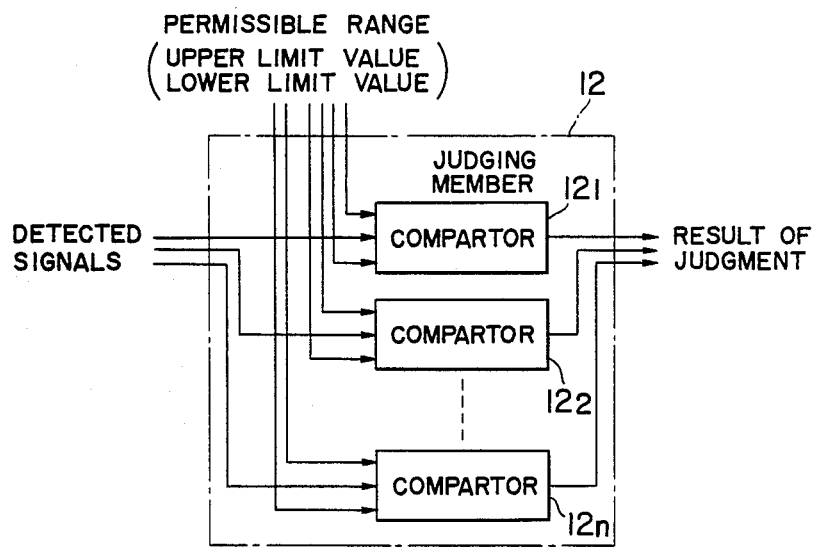
FIG. 2 is a block diagram showing the detail of the judging unit of the control apparatus shown in FIG. 1.

As shown in FIG. 2, the judging member 12 is constituted by a plurality of comparators 121, 122, ..., 12n of a number corresponding to the number of signals detected by sensors 10A. Each comparator is inputted with a detected signal and upper and lower limit values in the permissible range supplied from the set value memory means 14. Each comparator compares a detected signal with the upper limit value and the lower limit value for judging whether the detected signal is larger than the upper limit value, whether the detected signal lies between the upper and lower limit values, that is in the permissible range, and whether the detected signal is smaller than the lower limit value. When the quality of the molded product is judged based on the cushion quantity, the set value memory means 14 is set with the upper limit cushion quantity and the lower limit cushion quantity in the permissible range of a standard quality. When the detected cushion quantity lies between the lower limit cushion quantity and the upper limit cushion quantity it is judged that the cushion quantity is optimum and the quality of the products is good. When the detected cushion quantity is smaller than the lower limit cushion quantity, it is judged that the cushion quantity is too small so that the quality of the molded products is not good. On the other hand, when the detected cushion quantity exceeds the upper limit cushion quantity it is judged that the quality f the products is bad due to the excessive cushion quantity.

The output of the judging member 12 is applied to a storing unit 16 which in response to the output of the judging member 12 selects one of the production lot data stored in memory means 18 to store the selected data in a production lot data memory means 20.

More particularly, when the output of the judging member 12 shows that the quality of the molded products is good it is not necessary to change the production lot data now being stored in the production lot data memory means 20 so that the storing unit 16 does not store any production lot data. When it is judged that the quality of the molded product is not good, a more suitable production lot data is selected from the production lot data stored in the memory means 15 and the selected production lot data is stored in the production lot data memory means 20.

Figure 6:
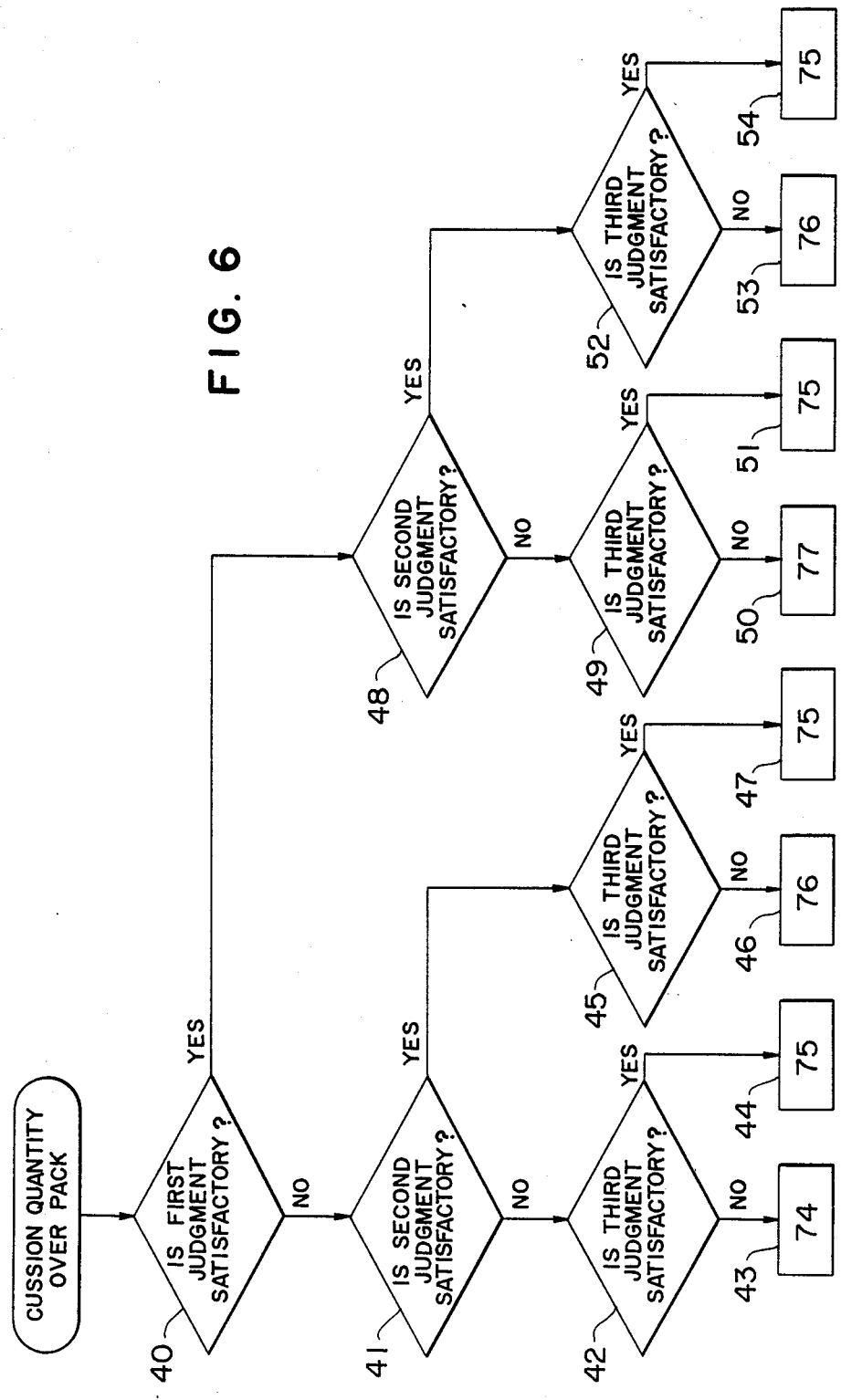
FIG. 6 is a flow chart showing the monitoring operation of the control apparatus.

The judging operation of the judging unit 12 will be described with reference to a flow chart shown in FIG. 6 which shows a case wherein the cushion quantity is judged as an over pack. In this case, items to be judged are the resin temperature, metal mold temperature, and an actual filling stroke. The first judgment is a judgment as to whether the resin temperature lies on the outside of the permissible range. The second judgment is a judgment as to whether the metal mold temperature lies on the outside of the permissible range, and the third judgment is a judgment as to whether the actual filling stroke lies on the outside of the permissible range. At step 40, the first judgment is made. When the result of judgment is NO, the program is advanced to step 41 for executing the second judgment whereas when the result of judgment is YES, the program is transferred to step 48. When the result of judgment at step 41 is NO, the program is advanced to step 42 for executing the third judgment, whereas when the result of judgment a step 41 is YES, the program is transferred to step 45. When the result of judgment at step 42 is NO, at step 43 the code 74 is produced, whereas when the result of judgment at step 42 is YES, at step 44, the code 75 is outputted. At step 45, the third judgment is executed. When the result of judgment of this step is NO, at step 46 the code 76 is produced, whereas when the result of judgment is YES, at step 47 the code 75 is produced. At step 48 a judgment is made as to whether the result of judgment at step 40 satisfies the first judgment. When the result of judgment at step 48 is NO, at step 49 a judgment is made as to whether the result of judgment at step 48 satisfies the third judgment. When the result of judgment at step 49 is NO, at step 50, the code 7 is produced, whereas when the result of judgment is YES, at step 51 the code 75 is produced. At step 52, a judgment is made as to whether the result of judgment executed at step 48 satisfies the third judgment. When the result of judgment at step 52 is NO, at step 53 the code 76 is produced, whereas when the result of judgment is YES, at step 54, the code 75 is produced. When various judgments are executed according to the flow chart shown in FIG. 6, codes 74–77 representing whether the three items to be judged (that is resin temperature, metal mold temperature and actual filling stroke) are within the permissible range or not, are produced. To judge the short shot, a similar flow chart is used.

The codes 75–77 representing the result of judgments are inputted to storing unit 16 which in response to these codes reads out one of the production data stored in memory means 18 and stores the read out data in production lot data memory means 20. More particularly, production lot data corresponding to the codes produced as the result of judgments are selected from the production lot data stored in memory means 18 and the selected data are stored in production lot data memory means 20.

Figure 4:
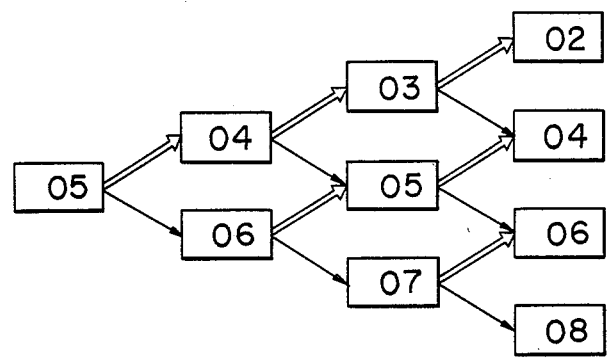
FIG. 4 is a block diagram showing the manner of changing the production lot data of the control apparatus.

With reference to FIGS. 3B and 4, the manner of selecting the production lot data to be stored effected by the storing unit 16 will be described. FIG. 3B shows one example of a table showing the arrangement of the production lot data. This table comprises a lot data number column written with numbers of the production lot data, a destination table column written with the numbers of the production lot data to be selected, and a control information column written with various control informations. In the destination table are written judging output codes and corresponding numbers of the destination production lot data.

As shown in FIG. 3B, memory means 18 prestores a plurality of production lot data. For example, six lot data numbers 03-08 are prepared for cushion quantities and stored in the memory means. Of these lot data numbers, number 03 means an over pack and numbers 04, 05, ... mean successive short shots. Thus, lot number 07 means the shortest shot. These lot numbers can be increased or decreased as desired. FIG. 4 shows a method of transferring the lot numbers. For example, when an over pack is judged for a given production lot data the lot data is transferred to a production lot data at the lower right position as shown by a thin arrow, whereas when a short shot is judged, the lot data is transferred to a production lot data at the upper right position as shown by a thick arrow. For example, when the result of control effected by lot data number 05 is judged an over pack, the lot data number 05 is transferred to lot data number 06, whereas when a short shot is judged the lot data number is transferred to lot data number 04.

For effecting the transfer as shown in FIG. 4 the contents of the production lot data stored in memory means 18 are arranged as shown in FIG. 3B. More particularly, in the destination table of the production lot data are stored judged output codes (74, 75, 76) and the destination lot data numbers (03, . . . , 07). The judging unit 12 is constructed to produce number 74 when the cushion quantity is a standard one, short shot number 75 when the cushion quantity is too small and an over pack number 76 when the cushion quantity is too large. These numbers represent judged output codes. In this embodiment, as shown in FIG. 3B the destination table of the production lot data number 04 stores the destination lot data numbers 04, 03 and 05 respectively for judged codes 74, 75 and 76, while the destination table of the production lot data number 05 stores destination lot data numbers 05, 04 and 06 respectively for judged codes 74, 75 and 76. The destination table of the production lot data number 06 stores destination lot data numbers 06, 05 and 07 respectively for judged codes 74, 75 and 76.

In response to a lot data number corresponding to the output data of judging member 12 by using the destination table of production lot data memory 20, the storing unit 16 reads out the production lot data of this lot data number from memory means 18 and stores the read out data in the production lot data memory means 20. Where the cushion quantity is a standard one, the production lot data stored in the production lot data memory means 20 does not change so that the data read out from the memory means 18 would not be stored in the production lot data memory means 20. With these measures the transfer as shown in FIG. 4 can be executed.

The numbers of the production lot data for the next lot are also stored in the destination table of the production lot data of the present lot. At the time of transferring to the next lot the production lot data are renewed based on the destination table in the production lot data.

A control unit 22 is used to control the injection molding machine. Namely it controls the actuator 10B based on the production lot data stored in the production lot data memory means 20.

Figure 7:
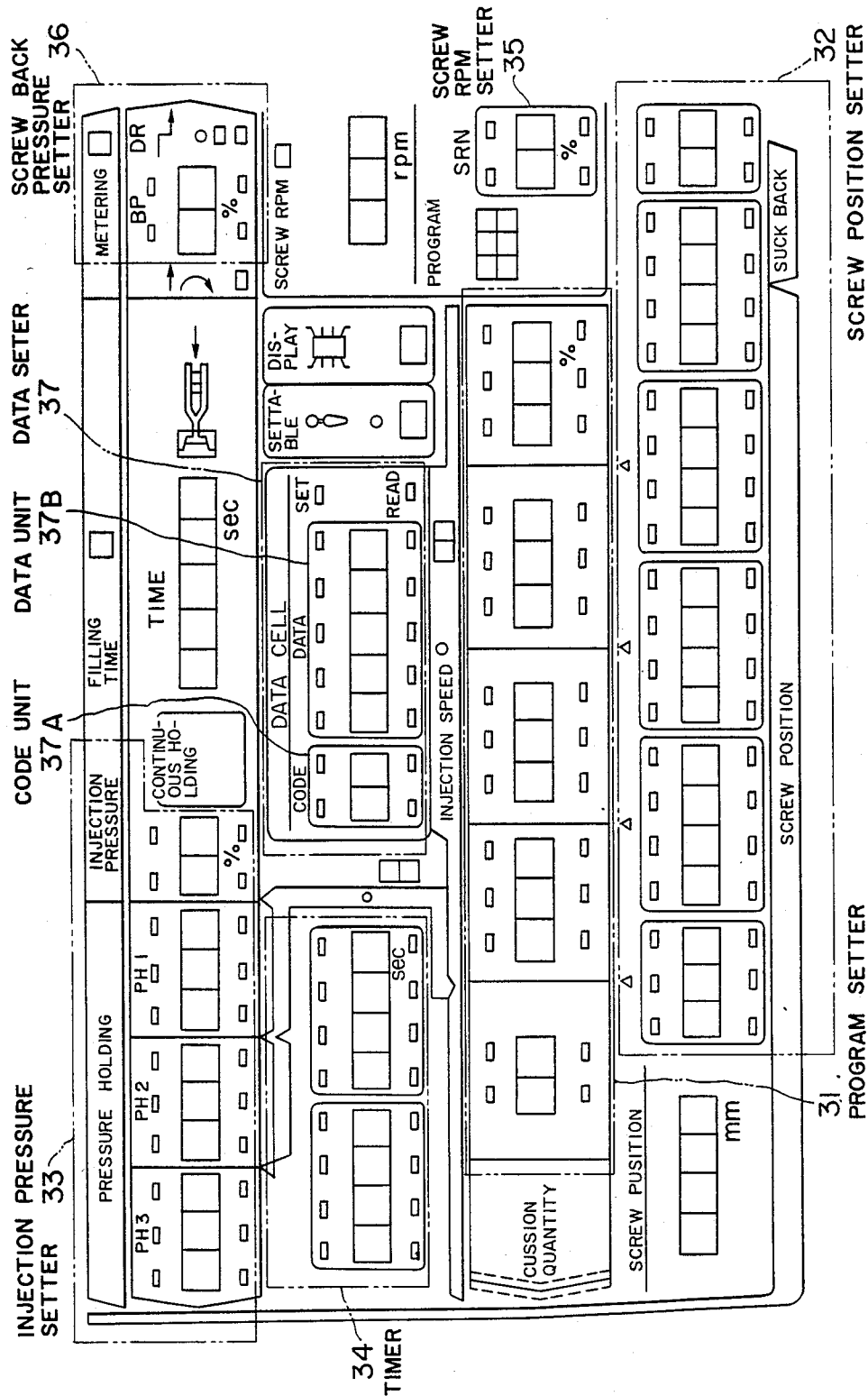
FIG. 7 is a front view showing the detail of the data input display members of the control apparatus embodying the invention.

A data input/display unit 24 that sets and displays data regarding the injection control of the injection molding machine 10 is shown in FIG. 7. More particularly, at he time of setting the data, the data input/display unit 24 is operated for inputting data to set the data in production lot data memory means 20. During operation of the injection molding machine 10 the data input display unit 24 displays the present control conditions of the machine.

Although various types of the data input/display unit 24 can be used, FIG. 7 shows one example thereof. Important parts of the data input/display unit 24 will be described as follows. A program setter 31 sets the injection speed and is constructed to set the injection speed in 5 programmed stages. A screw position setter 32 is provided to set the screw position and switch the injection shot size, suck back quantity, and the program control speed. An injection pressure setter 33 is provided to set the injection pressure and can program control the injection pressure in 4 stages. A timer 34 is provided for switching the injection pressure during the pressure holding step. A screw r.p.m. setter 35 is provided for setting the number of revolutions of the screw. A screw back pressure setter 36 is used to set the screw back pressure. A data setter 37 is used to set data of items not displayed normally. Data regarding a specific item is determined by a code designated by a code unit 37A and its content is set by a data unit 37B. Since in this embodiment code unit 37A has two orders of magnitude it can specify data of 100 items by using codes of 00-99. Among these 100 codes are included such production data informations as the selection of the operation modes of the injection molding machine, the number of required production shots, production completion advance notice shot number necessary for lot switching and the next lot data identifying symbols.

The control apparatus described above operates as follows. Necessary production lot data are prepared and stored in memory means 18. To this end, various methods can be used. For example, the production lot data can be prepared by an external computer and then inputted into the memory means 18 with suitable data input means, not shown. Further, it is also possible to manually input the data using the data input/display unit 24 for storing the inputted data in production lot data memory means 20. The production lot data thus set can be transferred from the production lot data memory means 20 to the memory means 18. It is also possible to read out the production lot data being stored in memory means 18 into the production lot data memory means 20 and a portion of the read out data can be corrected with the data input/display means 24 and then stored in the memory means 18.

After storing necessary production lot data in the memory means 18, the storing unit 16 reads out a standard production lot data from memory means 18 and stores the read out standard production lot data in the production lot data memory means 20. After that, an actual operation of the machine is commenced. In this embodiment the production lot data of the lot data number 05 representing a standard cushion quantity is stored in the production lot data memory means 20.

Figure 5:
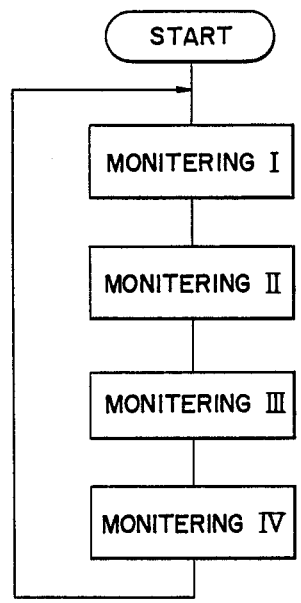
FIG. 5 is a flow chart showing the steps of operation of the judging member.

During the actual control operation various monitoring operations I-IV shown in FIG. 5 are executed periodically. As one of the monitoring operations, the detection of the cushion quantity is executed.

Thus, the judging member 12 periodically judges whether the cushion quantity lies in the permissible range or not so as to apply the result of judgment to the storing unit 16. Based on the result of judgment the storing unit 16 determines a destination production lot data in accordance with the destination table in the production lot data memory means 20. More particularly when the judged output lies in the permissible range of the standard cushion quantity no data storing action is executed, whereas when the judged output is larger than the upper limit value of the permissible range, meaning an over pack, a production lot data of the number 06 is transferred to the production lot data memory means 20 from memory means 18. When the judged output is smaller than the lower limit value of the permissible range, meaning a short shot, a production lot data of the lot data number 04 is transferred to the production lot data memory means 20 from memory means 18. Since the control of the injection molding machine 10 is performed by the production lot data stored in the production lot data memory means 20, the transfer of the production lot data as shown in FIG. 4 can be effected.

As above described, according to this embodiment as the production lot data to be used for the control is changed based on a data of a production lot data in accordance with the result of detection while constantly detecting the quality of the molded products so that it is possible to control the machine with the optimum production lot data. Moreover, as these production lot data can be corrected very simply, extremely flexible control can be realized.

It should be understood that the invention is not limited to the embodiment described above. For example, in the embodiment, although, as the item to be judged by the judging member 12 was shown the cushion quantity, so long as the item concerns the quality of the molded products any item can be used as the item to be judged. Thus, in addition to the cushion quantity, such other items that determine the quality as the filling pressure, the metal mold internal pressure and screw back pressure, such temperatures as the metal mold temperature, nozzle temperature, barrel temperature, operating oil temperature and ambient temperature and items caused by external disturbance, for example, variation in the resin viscosity which occurs between lots can be used. When set values for various items to be judged are stored in the set value memory means 14 and when the production lot data for renewal regarding respective items to be judged are stored in the memory means 18 it becomes possible to always control the injection molding machine 10 with optimum production lot data for various items to be judged.

The production lot data for certain number of items to be judged can be used simultaneously, thus effecting more flexible control.

In the foregoing embodiment, the judgment of the judging unit was made by comparing the upper limit set value with the lower limit set value, but the method of judgment is not limited to such method and various methods of judgment can be used corresponding to items to be judged. Alternatively, a portion of the set value utilized for the judgment may be incorporated into the production lot data for varying the set value itself.

According to the embodiment described above, since it is possible to change as desired the content of the production lot data to be changed for each item to be judged such as a variation in the quality of the products it is possible to prevent degradation of the quality, eliminate rejects, optimize the molding cycle and make control suitable for production requests. Thus, according to this invention optimum controls are possible in the following cases.

1. Rejects of the molded products due to not wanted configuration can be eliminated by using different controls for respective products. Thus, for example, optimum controls can be made for thick and thin products, cup shaped products, flat plate shaped products and grid shaped products.

2. It is possible to optimumly adjust the molding conditions to be suitable for the resin used. More particularly, it is possible to select optimum barrel temperature, nozzle temperature, mold temperature, filling temperature, and screw back pressure.

3. When the quality of the product varies in accordance with such constructual features of the metal mold as a direct gate, a pin gate and a hot runner, a control method can be selected suitable for effecting optimum adjustment suitable for a given metal mold condition.

What is claimed is:

1. Control apparatus for an injection molding machine, comprising:
    a sensor provided for said injection molding machine for producing a signal which represents a molding condition of said injection machine;
    set value memory means in which a permissible range of said signal is set;
    judging means for judging as to whether said signal lies in said permissible range;
    production lot data memory means containing a production lot control data set for said injection molding machine with respect to;
    a destination table stored in said production lot data memory means showing a destination of said data corresponding to a result of judgment of said judging means;
    control means for controlling said injection molding machine in accordance with said control data stored in said production lot data memory means;
    another memory means for storing a plurality of sets of said production lot data regarding various production lots; and
    storing means for determining a destination of said production lot data based on the result of judgment of said judging means by referring to said destination table stored in said production lot data memory means;
    said storing means transferring to said production lot data memory means said production lot data whose destination has been determined.

2. The control apparatus according to claim 1 wherein said another memory means stores a plurality of production conditions of said injection molding machine.

3. The control apparatus according to claim 1 wherein said judging means comprises a plurality of comparators which compare said signal with an upper limit value and a lower limit value of said permissible range.

4. Control apparatus for an injection molding machine, comprising:
    a sensor provided for said injection molding machine for producing a signal which represents quality of a product manufactured by said injection molding machine;
    set value memory means in which a permissible range of said signal is set;
    judging means for judging as to whether said signal lies in said permissible range;
    production lot data memory means containing a production lot control data set for said injection molding machine with respect to;
    a destination table stored in said production lot data memory means showing a destination of said data corresponding to a result of judgment of said judging means;

control means for controlling said injection molding machine in accordance with said control data stored in said production lot data memory means;

another memory means for storing a plurality of sets of said production lot data regarding various production lots; and storing means for determining a destination of said production lot data based on the result of judgment of said judging means by referring to said destination table stored in said production lot data memory means;

said storing means transferring to said production lot data memory means said production lot data whose destination has been determined.

5. The control apparatus according to claim 4 wherein said another memory means stores a plurality of production conditions of said injection molding machine.

6. The control apparatus according to claim 4 wherein said judging means comprises a plurality of comparators which compare said signal with an upper limit value and a lower limit value of said permissible range.

* * * * *